United States Patent
Tysak

(10) Patent No.: US 6,855,403 B2
(45) Date of Patent: Feb. 15, 2005

(54) MULTI-LAYER COATING COMPOSITION AND METHOD OF PREPARATION

(75) Inventor: Theodore Tysak, Ambler, PA (US)

(73) Assignee: Rohn and Haas Company, Philadelphia, PA (US)

( * ) Notice: Subject to any disclaimer, the term of this patent is extended or adjusted under 35 U.S.C. 154(b) by 66 days.

(21) Appl. No.: 10/449,348

(22) Filed: May 30, 2003

(65) Prior Publication Data

US 2003/0224195 A1 Dec. 4, 2003

Related U.S. Application Data

(60) Provisional application No. 60/385,355, filed on May 31, 2002.

(51) Int. Cl.[7] .......................... B32B 27/30; B32B 27/40; B32B 7/02
(52) U.S. Cl. ................. 428/212; 428/423.1; 428/423.3; 428/520; 428/522; 427/407.1; 427/372.2; 427/384
(58) Field of Search .............................. 428/212, 423.1, 428/423.3, 520, 522; 427/407.1, 384, 372.2

(56) References Cited

U.S. PATENT DOCUMENTS

| | | | |
|---|---|---|---|
| 4,150,005 A | 4/1979 | Gehman et al. | 260/28.5 R |
| 4,517,330 A | 5/1985 | Zdanowski et al. | 524/408 |
| 4,863,768 A * | 9/1989 | Ishio et al. | 428/34.9 |
| 5,149,745 A | 9/1992 | Owens et al. | 525/366 |
| 5,306,744 A | 4/1994 | Wolfersberger et al. | 523/201 |
| 5,428,107 A * | 6/1995 | Tysak et al. | 525/102 |
| 5,676,741 A | 10/1997 | Gray et al. | 106/3 |
| 5,912,298 A | 6/1999 | Gomi et al. | 524/591 |
| 6,197,844 B1 | 3/2001 | Hamrock et al. | 522/167 |
| 6,384,131 B1 | 5/2002 | Kinney et al. | 524/591 |
| 6,555,615 B2 * | 4/2003 | Van Rheenen | 524/606 |
| 6,558,795 B2 * | 5/2003 | Olson et al. | 428/413 |
| 2004/0071950 A1 * | 4/2004 | Olson et al. | 428/323 |
| 2004/0138327 A1 * | 7/2004 | Kohr et al. | 522/149 |
| 2004/0138328 A1 * | 7/2004 | Kohr et al. | 522/149 |

FOREIGN PATENT DOCUMENTS

| | | |
|---|---|---|
| WO | WO 01/83878 A2 | 11/2001 |
| WO | WO 02/085991 A1 | 10/2002 |

* cited by examiner

*Primary Examiner*—D. Lawrence Tarazano
(74) *Attorney, Agent, or Firm*—Stephen E. Johnson

(57) ABSTRACT

A method for preparing multi-layer protective coatings having enhanced durability with easy removability under conventional stripping conditions is disclosed. The invention is based on applying to a substrate, a first-coating composition that is removable, followed by application of a second-coating composition that is highly durable but not readily removable. Preferred second-coating compositions are based on polymers that provide highly crosslinked 'non-removable' (under conventional stripping conditions) coatings if used alone. The resultant multi-layer coating compositions provide enhanced detergent resistance while retaining easy overall removability properties.

16 Claims, No Drawings

MULTI-LAYER COATING COMPOSITION AND METHOD OF PREPARATION

CROSS REFERENCE TO RELATED PATENT APPLICATIONS

This is a non-provisional application of prior U.S. provisional application Ser. No. 60/385,355 filed May 31. 2002 now abandoned.

BACKGROUND

The present invention relates to highly durable, yet easily removable multi-layer protective coatings and their method of preparation. A conventional easily removable coating is first applied to a substrate, followed by application of a second coating that is highly durable and, in itself, not readily removable. The resultant multi-layer coating compositions of the present invention are particularly useful in polish and coating formulations where the combination of detergent resistance (durability) and easy removability properties is desirable.

Conventional highly crosslinked coating compositions typically do not provide easily removable coatings using traditional stripping operations (for example, treatment with solvent and ammonia or amines). Highly crosslinked coatings are desirable because of enhanced durability characteristics (such as long wear and scuff resistance) and are typically based on two-component (reactive) systems or systems requiring external energy sources to induce crosslinking (UV, electron beam) such that the resultant coatings do not swell significantly when exposed to typical chemical swelling agents and the film integrity is not disrupted to a sufficient extent to allow ready removability from a substrate. Typically, in order to assure enhanced durability, reduced ease of removability has become an undesirable but accepted characteristic of the highly durable coating compositions. For example, UV-curable coating compositions, such as those disclosed in U.S. Pat. No. 5,306,744 are extremely durable, but not readily removable by conventional stripping treatments. Similarly, single-package crosslinkable coating formulations based on polyurethane type and other latent crosslinking mechanisms (such as multicomponent systems) possess enhanced durability characteristics (scuff, mar or scratch resistance), but without the advantage of being readily removable upon demand. In addition, some of the crosslinking and post-crosslinking approaches suffer from other deficiencies, such as odor, environmental contamination, toxicity and compatibility problems. Due to their inherent lack of easy removability these highly durable coatings are typically limited in use to factory applied coatings and special end user markets, for example high performance wood floor coatings and industrial maintenance coatings.

Conventional easily removable protective coatings in the form of polishes are typically intended as sacrificial coatings to protect an underlying substrate by accepting and resisting marks, soils, scuffs, abrasion and scratches encountered in the normal use of the substrate, and, when the useful or aesthetic life of the protective coating has expired, the polish can be easily removed from the substrate to be replaced with a new coating. Typically, removability has been provided for these floor polishes by (i) incorporating metal ion crosslinking agents into polymers containing an excess of free carboxyl groups such that the metal ion crosslinking agents react with residual carboxyl groups (for example, from polymerized acrylic or methacrylic acid) or by (ii) the use of high levels of acid functionalized Alkali Soluble Resins (ASR) as formulation adjuncts. The relative excess of free carboxyl groups allows these coating compositions to swell when exposed to chemical swelling agents (such as aqueous ammonia or amines), thus rendering the coating easily removable when exposed to the stripping process; the swelling phenomenon interferes with cohesion and adhesion of the coating to the substrate such that film integrity is disrupted, thus facilitating removal of the coating from the substrate, for example, hard surfaces such as flooring, ceiling, walls and tiles. However, if sufficient acid functionality is added to the polish polymer or polish formulation for adequate long-term removability, resistance or durability of the polish film to scrubbing with alkaline detergent solutions is significantly diminished. Alternatively, if the acid functionality in the polish polymer or the amount of ASR in the formulation is reduced in order to allow for aggressive cleaning operations, then long-term ease of removability is compromised.

It would be desirable to provide coating compositions having the advantages of both the enhanced durability of highly crosslinked coatings and the easy removability of the more lightly crosslinked, but less durable, coating compositions. The problem addressed by the present invention is to provide coating compositions having these combined advantages, previously unavailable in conventional coating compositions.

STATEMENT OF INVENTION

The present invention provides a method for preparing a multi-layer coating composition comprising (a) applying a first-coating composition to a substrate wherein the first-coating composition comprises a polymer product having a gel fraction of 0.3 to 0.95 in a solvent selected from one or more of acetone and tetrahydrofuran and wherein the first-coating composition is applied in one or more separate applications, allowing the first-coating composition to dry after each application; and (b) applying a second-coating composition onto the dried first-coating composition of step (a) wherein the second-coating composition comprises a polymer product having a gel fraction of greater than 0.95 and up to 0.99 in a solvent selected from one or more of acetone and tetrahydrofuran and wherein the second-coating composition is applied in one or more separate applications, allowing the second-coating composition to dry after each application.

The present invention further provides a coated surface composition comprising a substrate bearing a multi-layer coating comprising (a) a first-coating composition disposed upon the substrate, wherein the first coating composition comprises a polymer product having a gel fraction in acetone of 0.3 to 0.95; and (b) a second-coating composition disposed upon the first coating composition, wherein the second coating composition comprises a polymer product having a gel fraction in acetone of greater than 0.95 and up to 0.99; wherein the substrate is selected from one or more of flooring, wall, ceiling and tile materials.

DETAILED DESCRIPTION

We have discovered that multi-layer protective coatings having enhanced durability (such as detergent resistance), yet also having easy removability under conventional stripping conditions, can be prepared by first applying a removable coating to a substrate, followed by application (onto the first coating) of a second coating that is highly durable but not readily removable. The second coating portion is preferably derived from polymers that provide highly crosslinked 'non-removable' (under conventional stripping conditions, if used alone) compositions. The resultant multi-layer coating compositions combine enhanced detergent resistance with easy removability properties.

As used herein, the following terms have the designated definitions, unless the context clearly indicates otherwise. The term "alkyl (meth)acrylate" refers to either the corresponding acrylate or methacrylate ester; similarly, the term "(meth)acrylic" refers to either acrylic or methacrylic acid and the corresponding derivatives, such as esters or amides. The term "copolymer" refers to polymer compositions containing units of two or more different monomers. The term "radiation-curable" in reference to coating compositions, refers to coating compositions that form a hardened coating upon exposure to radiation such as UV radiation, visible light or electron beam. The terms "ultraviolet radiation" and "UV radiation" are used interchangeably to refer to the spectrum of light having wavelengths in the range from about 180 to 400 nanometers; visible light refers to the spectrum of light having wavelengths in the range from about 400 to 800 nanometers. The term "coating composition" refers to aqueous-based or solvent-based liquid compositions that can be applied to a substrate and thereafter solidified (for example, by radiation, air curing, post-crosslinking or ambient temperature drying) to form a hardened coating on the substrate.

The term "substrate" refers to any surface (vertical, horizontal or inclined, such as flooring, walls, ceilings and stairways) upon which the coating compositions of the invention may be applied, and includes, for example, flooring, wall, ceiling and tile materials such as vinyl floor tiles (including tiles optionally coated with sealer or primer), ceramic tiles, wood, metal, concrete, marble, slate and simulated natural stone. Preferably the flooring, wall, ceiling and tile materials are selected from one or more of the group consisting of vinyl polymer, concrete, marble, ceramic and wood.

The term "gel fraction value" refers to a numerical index relating swellability of a polymer in an organic solvent and the ease of removability of the corresponding coating composition under conventional stripping conditions; gel fraction values greater than 0.95 indicate negligible swellability and polymers having values below 0.95 are considered swellable. The term "sealer" and "primer" are used interchangeably to refer to coating compositions that may be applied directly to a substrate and dried prior to application of coating compositions used in the method of the present invention; primer or sealer compositions are considered to be non-removable under conventional stripping conditions for purposes of the present invention.

All percentages referred to will be expressed in weight percent (%), based on total weight of polymer or composition involved, unless specified otherwise. The following abbreviations are used herein: g=grams, cm=centimeters, cm²=square centimeters, mJ=millijoules. Unless otherwise specified, ranges listed are to be read as inclusive and combinable and temperatures are in degrees centigrade (° C.).

The method of the present invention may be illustrated by the following description. A substrate is coated with a first-coating composition (base coat) that is readily removable under conventional stripping conditions, where the first-coating composition has a gel fraction value in organic solvent of 0.30 to 0.95. The first-coating composition is typically applied in a single step and allowed to dry; optionally the first-coating composition may be applied in multiple steps where each application is allowed to dry before the next application; in the case of multiple applications, 2 to 5 separate applications are typically used, followed by a final drying step to allow the first-coating composition to harden. The coating compositions useful in the present invention readily dry at temperatures as low as 10° C. For the purposes of the present invention, "allowed to dry" (as in 'each application is allowed to dry before the next application') refers to the coating composition drying and hardening to the point where the surface is no longer soft or tacky to the touch under light finger pressure.

After the first-coating composition has been applied onto a surface, a second-coating composition (top coat) is applied over and onto the dried first-coating composition, where the second-coating composition has a gel fraction value in organic solvent of greater than 0.95 and up to 0.99. Similarly to that described above for application of the first-coating composition, the second-coating composition may be applied in one or more separate applications where each application is allowed to dry before the next application, followed by a final drying step to allow the second-coating composition to dry and harden. The second-coating composition itself is highly durable and resistant to removal under conventional stripping conditions ('non-removable') if it were to be applied directly to a hard surface substrate, or optionally over a primer or sealer layer applied to the substrate. However, the resultant multi-layer coating compositions of the present invention, comprising the second-coating composition applied onto the first-coating composition, provide enhanced durability and detergent resistance, yet are readily removable under conventional stripping conditions.

For the purposes of the present invention, conventional stripping conditions refer to the use of some form of mechanical abrasion (for example, wiping, brushing or scrubbing) in the presence of solutions (aqueous, aqueous-alcohol or solvent-containing mixtures) containing amine or ammonia (typical contact times of at least 10 to 30 minutes), to provide removal of the entire coating from a coated substrate.

Suitable compositions for use as the easily removable first-coating composition are those having a gel fraction value in organic solvent of 0.30 to 0.95, preferably from 0.4 to 0.9 and more preferably from 0.5 to 0.8; the first-coating compositions may be aqueous-based or solvent-based. Base coat floor polish compositions of the present invention typically comprise an aqueous suspension or dispersion of one or more water insoluble emulsion polymers containing acid functional residues and, optionally, polyvalent metal ion or complex crosslinking agents. Such first-coating compositions include, for example, acrylic-based polymer products selected from one or more of polymers (1), (2) and (3) described below:

(1) First polymer comprising, as polymerized monomer units (a) 3 to 90, preferably 6 to 30 and more preferably 10 to 15 percent, based on weight of the first polymer, of monoethylenically unsaturated monomer containing a carboxylic acid functional group; (b) zero up to 40, preferably zero up to 25 and more preferably zero up to 15 percent, based on weight of the first polymer, of a (meth)acrylic monomer containing one or more pendant reactive functional groups selected from vinyl and hydroxy groups; (c) zero up to 80 percent, based on weight of the first polymer, of one or more vinylaromatic monomers; (d) zero up to 97, preferably 20 to 90 and more preferably 60 to 80 percent, based on weight of the first polymer, of one or more $(C_1-C_{20})$alkyl (meth)acrylate ester monomers; (e) zero up to 10 percent, based on weight of the first polymer, of one or more other copolymerizable monomers; and (f) zero up to 90, preferably 5 to 80 and more preferably 20 to 75 percent, based on equivalents of carboxylic acid groups of the first polymer, of polyvalent metal ion, preferably selected from one or more of the group consisting of zinc, calcium, magnesium and zirconium. U.S. Pat. Nos. 4,150,005, 4,517,330, 5,149,745 and 5,676,741 may be consulted for further general and specific details on the preparation of first-coating compositions representative of polymer (1).

(2) Second polymer comprising, as polymerized monomer units (a) 3 to 30 and preferably 5 to 20 percent, based on weight of the second polymer, of a monoethylenically unsaturated monomer containing amino-group functionality; (b) 0.2 to 9, preferably 0.2 to 1.5 and more preferably 0.4 to 1 percent, based on weight of the second polymer, of a (meth)acrylic monomer containing one or more pendant reactive functional groups selected from vinyl, epoxy and acetoacetoxy groups; (c) zero up to 80 percent, based on weight of the second polymer, of one or more vinylaromatic monomers; (d) zero up to 97 percent, based on weight of the second polymer, of one or more ($C_1$–$C_{20}$)alkyl (meth)acrylate ester monomers; and (e) zero up to 10 percent, based on weight of the second polymer, of one or more other copolymerizable monomers. U.S. Pat. No. 5,676,741 may be consulted for further general and specific details on the preparation of first-coating compositions representative of polymer (2).

(3) Third polymer derived from combining (i) a first-stage polymer comprising, as polymerized monomer units: (a) 5 to 50 percent, based on weight of the first-stage polymer, of a monoethylenically unsaturated monomer containing an acid functional group selected from one or more of carboxylic, sulfonic and phosphonic groups; (b) zero up to 60 percent, based on weight of the first-stage polymer, of a (meth)acrylic monomer containing one or more pendant reactive functional groups selected from hydroxy, thiol, and amino groups; (c) zero up to 70 percent, based on weight of the first-stage polymer, of one or more vinylaromatic monomers; (d) 15 to 90 percent, based on weight of the first-stage polymer, of one or more ($C_1$–$C_{20}$)alkyl (meth)acrylate ester monomers; and (e) zero up to 10 percent, based on weight of the first-stage polymer, of one or more other copolymerizable monomers; with (ii) a polyfunctional crosslinker agent comprising pendant functional groups selected from one or more of isocyanate, carbodiimide, aziridinyl and epoxy groups; wherein, the first-stage polymer has a number average molecular weight from greater than 5,000 up to 2,000,000; and the polyfunctional crosslinker agent is used in an amount sufficient to provide from 0.2 to 5 equivalents of pendant functional group per equivalent of corresponding pendant reactive functional group in the first-stage polymer. The carboxylic acid functional groups of the first-stage polymer are included in the "corresponding pendant reactive functional groups" referred to above.

With reference to aforementioned polymers (1), (2) and (3), suitable carboxylic acid monomers include monoethylenically unsaturated ($C_3$–$C_9$)carboxylic acid monomers, such as unsaturated monocarboxylic and dicarboxylic acid monomers. For example, unsaturated monocarboxylic acids include acrylic acid (AA), methacrylic acid (MAA), α-ethacrylic acid, β,β-dimethylacrylic acid, vinylacetic acid, allylacetic acid, ethylidineacetic acid, propylidineacetic acid, crotonic acid, acryloxypropionic acid and corresponding alkali and metal salts thereof. Suitable unsaturated dicarboxylic acid monomers include, for example, maleic acid, maleic anhydride, fumaric acid, itaconic acid, citraconic acid, mesaconic acid, methylenemalonic acid and corresponding alkali and metal salts thereof. Other suitable acidic monoethylenically unsaturated monomers include the partial esters of unsaturated aliphatic dicarboxylic acids (alkyl half esters); for example, the alkyl half esters of itaconic acid, fumaric acid and maleic acid wherein the alkyl group contains 1 to 6 carbon atoms (methyl acid itaconate, butyl acid itaconate, ethyl acid fumarate, butyl acid fumarate and methyl acid maleate). Preferably, the monoethylenically unsaturated ($C_3$–$C_9$)carboxylic acid monomers are selected from one or more of acrylic acid, methacrylic acid and corresponding alkali and metal salts thereof.

With reference to aforementioned polymers (1), (2) and (3), suitable (meth)acrylic monomer containing pendant reactive functional groups include the following: hydroxy-functional (meth)acrylic monomers, for example, hydroxy ($C_1$–$C_4$)alkyl (meth)acrylates, such as hydroxyethyl methacrylate, hydroxyethyl acrylate, hydroxypropyl methacrylate and hydroxypropyl acrylate—preferably the hydroxy-functional (meth)acrylic monomer is hydroxyethyl methacrylate (HEMA); amino-functional or amino group-containing (meth)acrylic monomers, for example, dimethylaminopropyl (meth)acrylamide, dimethylaminoethyl (meth)acrylate, dimethylaminopropyl (meth)acrylate, t-butylaminoethyl (meth)acrylate and methyaminoethyl acrylate; thiol-functional (meth)acrylic monomers, for example, 2-mercaptopropyl methacrylate; vinyl-containing monomers, for example allyl methacrylate and glycidyl (meth)acrylate; epoxy (meth)acrylic monomers, for example, glycidyl (meth)acrylate; and amine-reactive or air-curable (meth)acrylic monomers, for example, those containing acetoacetoxy groups, such as acetoacetoxyethyl methacrylate (2-(methacryloyloxy)ethyl acetoacetate), acetoacetoxyethyl acrylate, acetoacetoxypropyl acrylate, acetoacetoxypropyl methacrylate, acetoacetoxybutyl acrylate, acetoacetoxybutyl methacrylate, 2,3-di(acetoacetoxy)propyl acrylate and 2,3-di(acetoacetoxy)propyl methacrylate. In addition to the above, non-(meth)acrylic monomers containing pendant reactive functional groups may be used, such as divinylbenzene and allyl acetoacetate.

With reference to aforementioned polymers (1), (2) and (3), suitable vinylaromatic monomers include, for example, styrene, α-methyl styrene and substituted styrenes, such as vinyl toluene, 2-bromostyrene, 4-chlorostyrene, 2-methoxystyrene, 4-methoxystyrene, α-cyanostyrene, allyl phenyl ether and allyl tolyl ether. When present, the vinylaromatic monomer is preferably styrene.

With reference to aforementioned polymers (1), (2) and (3), suitable ($C_1$–$C_{20}$)alkyl (meth)acrylate ester monomers include, for example, methyl acrylate, ethyl acrylate, propyl acrylate, isopropyl acrylate, butyl acrylate, isobutyl acrylate, secondary butyl acrylate, tertiary-butyl acrylate, methyl methacrylate, ethyl methacrylate, propyl methacrylate, isopropyl methacrylate, cyclopropyl, methacrylate, butyl methacrylate and isobutyl methacrylate, hexyl and cyclohexyl methacrylate, cyclohexyl acrylate, isobornyl methacrylate, 2-ethylhexyl acrylate (EHA), 2-ethylhexyl methacrylate, octyl (meth)acrylate, decyl (meth)acrylate, isodecyl (meth)acrylate, undecyl (meth)acrylate, dodecyl (meth)acrylate (also known as lauryl (meth)acrylate), tridecyl (meth)acrylate, tetradecyl (meth)acrylate (also known as myristyl (meth)acrylate), pentadecyl (meth)acrylate, hexadecyl (meth)acrylate (also known as cetyl (meth)acrylate), heptadecyl (meth)acrylate, octadecyl (meth)acrylate (also known as stearyl (meth)acrylate), nonadecyl (meth)acrylate, eicosyl (meth)acrylate and combinations thereof. Typically, the ($C_1$–$C_{20}$)alkyl (meth)acrylate esters are ($C_1$–$C_8$)alkyl (meth)

acrylate esters and preferably ($C_1$–$C_8$)alkyl acrylate esters; more preferably, the ($C_1$–$C_8$)alkyl acrylate esters are selected from methyl acrylate, ethyl acrylate, butyl acrylate and 2-ethylhexyl acrylate; most preferably, the acrylate esters are selected from butyl acrylate and 2-ethylhexyl acrylate.

With reference to aforementioned polymers (1), (2) and (3), suitable other copolymerizable monomers include, for example, butadiene, divinylbenzene, acrylonitrile, methacrylonitrile, crotononitrile, α-chloroacrylonitrile, ethyl vinyl ether, isopropyl vinyl ether, isobutyl vinyl ether, butyl vinyl ether, diethylene glycol vinyl ether, decyl vinyl ether, ethylene, methyl vinyl thioether and propyl vinyl thioether, esters of vinyl alcohol (such as vinyl formate, vinyl acetate, vinyl propionate, vinyl butyrate and vinyl versatate), poly(alkyleneoxide) di(meth)acrylates, butanediol acrylate, 3-chloro-2-hydroxypropyl acrylate; amides of ethylenically unsaturated ($C_3$–$C_6$)carboxylic acids, amides of ethylenically unsaturated ($C_3$–$C_6$)carboxylic acids that are substituted on the nitrogen by one or two ($C_1$–$C_4$)alkyl groups, acrylamide, methacrylamide and N-methylol (meth) acrylamide; monoethylenically unsaturated monomers containing sulfonic acid or phosphonic groups (such as 2-acrylamido-2-methyl-1-propanesulfonic acid, 2-methacrylamido-2-methyl-1-propanesulfonic acid, 3-methacryl-amido-2-hydroxypropanesulfonic acid, allyl-sulfonic acid, methallyl-sulfonic acid, allyloxybenzenesulfonic acid, methallyloxybenzenesulfonic acid, 2-hydroxy-3-(2-propenyloxy)propanesulfonic acid, 2-methyl-2-propene-1-sulfonic acid, styrenesulfonic acid, vinylsulfonic acid, 2-sulphoethyl methacrylate, 3-sulfopropyl acrylate, 3-sulfopropyl methacrylate, sulfomethyl acrylamide, sulfomethyl methacrylamide and phosphoethyl methacrylate); and acetoacetoxy-containing, carboxyl-containing, vinyl-containing, amino-containing, epoxy-con-taining, thiol-containing and hydroxy-containing monomers not otherwise already present in the polymer composition.

With reference to the aforementioned polymer (1), suitable polyvalent metal ions include, for example zinc, cadmium, nickel, zirconium, strontium, tin, calcium, magnesium and copper; preferably the polyvalent metal ion is selected from one or more of the group consisting of zinc, calcium, magnesium and zirconium. When used, the amount of polyvalent metal ion and optionally a basic hydroxide or salt of an alkali metal, is from 5 to 80% of the equivalents of the acid residues in the polymer. Suitable monovalent alkali metal ions include, for example, lithium, sodium and potassium ions. U.S. Pat. Nos. 4,517,330 and 5,149,745 may be consulted for further general and specific details on the preparation of aqueous-based emulsion polymers crosslinked with polyvalent metal ions. The optional polyvalent metal ions are typically added to the aqueous medium of the coating composition (pH of 4 to 8) as an aqueous slurry of the oxides, hydroxides, ammonia or polyamine complexes, and carbonates or bicarbonates of the corresponding metal ion, for example, $CaCO_3$, ZnO and $Mg(OH)_2$. The polyvalent metal ions may be incorporated into the coating composition at any stage of its formulation. Similarly, the basic salt of the alkaline metal may be incorporated with the polyvalent metal ion at any stage of formulating the coating composition.

With reference to the aforementioned polymer (3), suitable polyfunctional crosslinker agents include those containing one or more pendant functional groups selected from isocyanate, carbodiimide, aziridinyl and epoxy groups. When the pendant functional group is an isocyanate group, it will react with corresponding reactive hydroxy or thiol functional groups in the first-stage polymer. When the pendant functional group is a carbodiimide group, it will react with corresponding carboxyl reactive functional groups in the first-stage polymer. When the pendant functional groups are aziridinyl or epoxy groups, they will react primarily with corresponding thiol or amino reactive functional groups in the first-stage polymer.

Suitable polyisocyanate, polycarbodiimide, polyaziridinyl and polyepoxy crosslinker agents may be based on any aliphatic, aromatic (or mixture thereof) backbone polymer suitably substituted with the desired pendant functional groups. For example, the backbone polymers may be prepared by conventional vinyl polymerization or condensation polymerization reactions where the pendant functional groups are incorporated during polymer formation or by post-reaction. Typically, the amount of polyfunctional crosslinker agent used relative to the first-stage polymer in preparing the aforementioned type (3) polymers will be in an amount sufficient to provide from 0.2 to 5, preferably from 0.4 to 4 and more preferably from 0.6 to 2, equivalents of isocyanate, carbodiimide, aziridinyl or epoxy functional group, per equivalent of corresponding pendant reactive functional group in the first-stage polymer. Typically, this corresponds to 1 to 90%, preferably from 5 to 75% and more preferably from 10 to 50%, of polyfunctional crosslinker, based on weight of the first-stage polymer.

When the pendant functional groups of the polyfunctional crosslinker agents are carbodiimide, aziridinyl or epoxy groups, the backbone polymer may be based on any suitable vinyl monomer carrying the corresponding functional group (such as glycidyl methacrylate) or reactive group that is capable of post reacting to attach the carbodiimide, aziridinyl or epoxy group. Alternatively, polyfunctional crosslinker agents based on isocyanate, carbodiimide, aziridinyl or epoxy group functionality may be derived from non-polymeric materials, as long as they are "polyfunctional" in terms of crosslinking efficacy. Suitable polyepoxide crosslinkers include, for example, ($C_4$–$C_8$)diepoxyalkanes and diepoxyaralkanes such as, 1,2,3,4-diepoxybutane, 1,2, 4,5-diepoxypentane, 1,2,5,6-diepoxyhexane, 1,2,7,8-diepoxyoctane, 1,4- and 1,3-divinylbenzene diepoxides, ($C_6$–$C_{15}$)polyphenol polyglycidyl ethers (such as 4,4'-isopropylidene-diphenol diglycidyl ether (also known as bisphenol A diglycidyl ether) and hydroquinone diglycidyl ether), polyglycidyl ethers of ($C_2$–$C_6$)alkanepolyols and poly(alkylene glycols) such as, ethylene glycol diglycidyl ether, diethylene glycol diglycidyl ether, polyethyleneglycol diglycidyl ether, glycerine diglycidyl ether and triglycidyl ether, propylene glycol diglycidyl ether and butanediol diglycidyl ether, and polyglycidyl ethers of erythritol, trimethylolethane and trimethylol-propane.

Suitable polyaziridinyl crosslinkers include, for example, polyaziridinyl derivatives of ($C_2$–$C_6$)alkanepolyols such as, pentaerythritol-tris[β-(N-aziridinyl)-propionate], trimethylolpropane-tris[β-(N-aziridinyl)propionate], pentaerythritol-bis[β-(N-aziridinyl)propionate] and trimethylolpropane-bis-[β-(N-aziridinyl)-propionate].

When the pendant functional groups of the polyfunctional crosslinker agent are isocyanate groups, the crosslinkers are typically referred to as polyisocyanates, such as the water-dispersible polyisocyanates and mixtures of polyisocyanates that are commercially available, for example, from Bayer Corporation (such as Bayhydur™ XP-7063, XP-7148, and XP-7165 polyisocyanates), Miles Corporation or Rhodia Corporation. U.S. Pat. No. 5,252,696 may be consulted for further general and specific details regarding suitable water-dispersible hydrophilically-modified polyisocyanates that may be used as the polyfunctional crosslinking agent. Suitable polyisocyanates include, for example, those based on derivatives of 1,4-diisocyanatobutane, 1,6-diisocyanatohexane (HDI), 1,5-diisocyanato-2,2-dimethylpentane, 2,2,4-trimethyl-1,6-diisocyanatohexane, 2,4,4-trimethyl-1,6-diisocyanatohexane, 1,10-diisocyanatodecane, 1,3-diisocyanatocyclohexane, 1,4-diisocyanatocyclohexane, 1-isocyanato-3,3,5-trimethyl-5-isocyanatomethylcyclohexane (isophorone diisocyanate, IPDI), 4,4'-diisocyanatodicyclohexylmethane, triisocyanates (such as 2,4,4'-triiso-cyanatodiphenyl ether, 4,4',4"-triisocyanatotriphenylmethane and trimeric 1,6-diisocyanatohexane) and dimeric 1,6-diisocyanatohexane. Preferably the polyisocyanates used as the polyfunctional crosslinker agent are based on hydrophilically-modified derivatives of 1,6-diisocyanatohexane. Additional polyisocyanates, include, for example, those based on aromatic diisocyanates such as 2,4- and 2,6-tolylene diisocyanate, m-phenylene diisocyanate, xylylene diisocyanate, 4,4'-biphenylene diisocyanate, 1,5-naphthylene diisocyanate; preferably the polyisocyanates used as the polyfunctional crosslinker agent are substantially free of aromatic isocyanate derivatives, that is, from zero to less than 5%, more preferably from zero to less than 1% and most preferably from zero to less than 0.5%, based on weight of polyfunctional crosslinker agent.

In addition to the aforementioned (1), (2) and (3) acrylic-based polymer products suitable for use as first-coating compositions, acid-functionalized polyurethane polymers may also be used. For example, the first-coating composition may be a polyurethane polymer that is the reaction product of at least two polyol reactants and a polyisocyanate reactant comprising as polymerized units: (a) 2 to 50, preferably 5 to 15 percent, based on weight of the polyurethane polymer, of polyol containing a carboxylic acid functional group; (b) 2 to 80, preferably 30 to 70 percent, based on weight of the polyurethane polymer, of polyol selected from one or more of saturated and unsaturated polyhydric alcohols, polyester polyols, polyether polyols and polycarbonate polyols; (c) 20 to 70, preferably 30 to 50 percent, based on weight of the polyurethane polymer, of a polyisocyanate reactant selected from one or more of aromatic, cycloaliphatic and aliphatic polyisocyanates; and (d) zero up to 40 percent, based on weight of the polyurethane polymer, of a polyether selected from one or more of capped polyalkyleneglycols and polyether polyols; wherein calcium ion crosslinker agent is present in an amount sufficient to provide from 0.05 to 0.9, preferably 0.3 to 0.6, equivalents of calcium ion per equivalent of corresponding carboxylic acid functional group.

Typically the acid-functionalized polyurethane polymers are prepared as prepolymers formed from the reaction of diol compounds (such as polypropylene glycols), diisocyanate compounds (such as isophorone diisocyanate) and a polyhydroxycarboxylic acid (such as 2,2-dimethylolpropionic acid) in an organic solvent in the presence of a base catalyst and further reacting the prepolymers with chain extending agents such as polyamines. Further examples of suitable polyols, acid-functionalized polyols and polyisocyanate reactants may be found in the discussion of polymer (6).

Preferably, the acid-functionalized polyurethanes have from 2 to 20 acid functional groups per polyurethane repeating unit. Suitable calcium compounds useful for forming the calcium crosslinks include, for example, calcium oxide, calcium hydroxide and calcium carbonate. U.S. Pat. No. 5,912,298 may be consulted for further general and specific details on preparation of the acid-functionalized polyurethane polymers useful as first-coating compositions.

Optionally, a sealer or primer coating composition may be applied directly to a substrate and dried prior to application of the first-coating composition, thus providing a layer over the substrate to which the first-coating composition may bond. Suitable primer compositions include, for example, acrylic polymer latices having a solids content from about 2 to about 40% and preferably from 4 to 15%. Preferably the acrylic polymer latices are hydrophobic in nature, but may contain some hydrophilic groups. Suitable primer compositions include those commercially available from Rohm and Haas Company (Philadelphia, Pa., USA), such as ROSHIELD™ 3120 emulsion having a polymer solids content of about 40% by weight; preferably this emulsion concentrate is diluted with water (up to a ratio of 1 to 9 parts water per 1 part emulsion) before being applied as a primer. Although primer formulations containing the aforementioned ROSHIELD™ 3120 emulsion are preferred, other commercially available materials may also be used as primers or sealers, for example, CORNERSTONE™ sealer (available from Minnesota Mining and Manufacturing Company, St. Paul, Minn., USA), TOPLINE™ sealer (available from Minnesota Mining and Manufacturing Company, St. Paul, Minn., USA) and TECHNIQUE™ sealer (S.C. Johnson, Milwaukee, Wis., USA).

Primer formulations may be applied to a substrate by any suitable method, for example, wiping, brushing and spraying. The latex is allowed to dry, typically under ambient conditions, and the first-coating compositions used in the present invention may then be applied and allowed to dry and harden.

Suitable highly durable non-removable second-coating compositions (top coat) useful in the method of the present invention include those based on polymers having a gel fraction value of greater than 0.95 and up to 0.99, preferably from 0.96 to 0.98; the second-coating compositions may be aqueous-based or solvent-based. While not wishing to be bound by theory, I believe that the highly durable second-coating compositions should possess some permeability, hence a gel fraction value less than 1.0, to the components (solvent or amine) used in conventional stripping operations so that some portion of the stripping solution may have access to the first-coating composition (over which the second-coating composition is disposed) in order to swell and subsequently remove the entire multi-layer coating composition.

Among the suitable second-coating compositions are radiation-curable compositions, multicomponent compositions containing a crosslinking agent, and highly pre-crosslinked compositions that form coating films. Representative of radiation-curable coatings are compositions comprising polymerized units of a polyfunctional isocyanurate having at least three terminal reactive groups reacted with a hydroxyalkyl (meth)acrylate; U.S. Pat. No. 6,197,844 may be consulted for further general and specific details on the use of this type of coating composition.

Photopolymerization involves irradiation of ethylenically unsaturated compounds in the presence of a photoinitiator, where "photoinitiator" refers to any material or combination of materials that interact with light to generate free radicals suitable for initiating free radical polymerization. Photopolymerizations occur when radicals are produced by ultraviolet (UV) or visible light irradiation, or combination thereof, of a free radical polymerizable reaction system. Photopolymerization may be applied in the formation of protective coatings for metal, paper, wood and plastic substrates. Typical applications involve a combination of photopolymerization and crosslinking, with the crosslinking achieved by the use of polyunsaturated monomers. Suitable systems include acrylate, unsaturated polyester and styrenic-based compositions.

Additionally, UV curable protective coatings may be applied to vinyl flooring during sheet manufacturing processes to provide gloss and abrasion resistance. The curing of these coating compositions is conducted using high intensity light in an inert atmosphere to minimize the deleterious effects of oxygen on the curing process. After application to a substrate, these protective coatings typically cannot be easily stripped from the flooring to which they were applied using conventional stripping methods, such as application of a chemical stripping composition with a stripping pad or brush.

Suitable compositions for use as the highly durable second-coating compositions in the method of the present invention include, for example, polymers (4), (5), (6) and (7) described below:

(4) Acrylic-based polymer product derived from combining (1) a first-stage polymer comprising, as polymerized monomer units (a) 0.1 to 30 percent, based on weight of the first-stage polymer, of a monoethylenically unsaturated monomer containing a carboxylic acid functional group; (b) zero up to 60 percent, based on weight of the first-stage polymer, of a (meth)acrylic monomer containing one or more pendant reactive functional groups selected from vinyl, epoxy, hydroxy, thiol, acetoacetoxy and amino groups; (c) zero up to 70 percent, based on weight of the first-stage polymer, of one or more vinylaromatic monomers; (d) zero up to 90 percent, based on weight of the first-stage polymer, of one or more ($C_1$–$C_{20}$)alkyl (meth)acrylate ester monomers; and (e) zero up to 10 percent, based on weight of the first-stage polymer, of one or more other copolymerizable monomers; with (2) a polyfunctional crosslinker agent comprising pendant functional groups selected from one or more of isocyanate, carbodiimide, aziridinyl, vinyl, hydroxy, thiol, acetoacetoxy, amino and epoxy groups; wherein, the first-stage polymer has a number average molecular weight from greater than 5,000 up to 2,000,000; and the polyfunctional crosslinker agent is used in an amount sufficient to provide from 0.2 to 10 equivalents of pendant functional group per equivalent of corresponding pendant reactive functional group in the first-stage polymer.

A preferred embodiment of polymer (4) is represented by the polymer product derived from combining (1) a first-stage polymer comprising, as polymerized monomer units: (a) 1 to 20 percent, based on weight of the first-stage polymer, of monoethylenically unsaturated monomer containing a carboxylic acid functional group; (b) 2 to 60 percent, based on weight of the first-stage polymer, of a (meth)acrylic monomer containing one or more pendant reactive hydroxy functional groups; and (c) zero up to 20 percent, based on weight of the first-stage polymer, of one or more ($C_1$–$C_{20}$)alkyl (meth)acrylate ester monomers; with (2) a polyfunctional crosslinker agent comprising pendant isocyanate functional groups.

(5) Acrylic-based polymer product, comprising, as polymerized monomer units: (a) zero to 30 percent, based on weight of the polymer, of a mono-ethylenically unsaturated monomer containing a carboxylic acid functional group; (b) 1 to 80 and preferably 5 to 70 percent, based on weight of the polymer, of a (meth)acrylic monomer containing functional groups selected from one or more of isocyanurate, pendant vinyl, pendant acetoacetoxy and pendant amino groups; (c) zero up to 70, preferably 10 to 40 percent, based on weight of the polymer, of one or more vinylaromatic monomers; (d) zero up to 90, preferably 20 to 80 percent, based on weight of the polymer, of one or more ($C_1$–$C_{20}$) alkyl (meth)acrylate ester monomers; and (e) zero up to 10 percent, based on weight of the polymer, of one or more other copolymerizable monomers. Preferably, the polymer product is a radiation-curable composition where the polymer product comprises, as polymerized monomer units (a) 5 to 70 percent, based on weight of the polymer, of a (meth) acrylic monomer containing vinyl functional groups, preferably glycidyl methacrylate; (b) 10 to 40 percent, based on weight of the polymer, of one or more vinylaromatic monomers, preferably styrene; and (c) 20 to 80 percent, based on weight of the polymer, of one or more ($C_1$–$C_{20}$) alkyl (meth)acrylate ester monomers, preferably selected from one or more of butyl acrylate and methyl methacrylate. U.S. Pat. Nos. 5,306,744 and 6,197,844 may be consulted for further general and specific details on the preparation of first-coating compositions representative of polymer (5).

(6) Polyurethane polymer that is the reaction product of at least one polyol with a polyisocyanate reactant comprising as polymerized units: (a) zero up to 20 percent, based on weight of the polyurethane polymer, of a polyol containing a carboxylic acid functional group; (b) 10 to 80 percent, based on weight of the polyurethane polymer, of polyol selected from one or more of saturated and unsaturated polyhydric alcohols, polyester polyols, polyether polyols and polycarbonate polyols; (c) 10 to 30 percent, based on weight of the polyurethane polymer, of a polyisocyanate reactant selected from one or more of aromatic, cycloaliphatic and aliphatic polyisocyanates; and (d) zero up to 40 percent, based on weight of the polyurethane polymer, of a polyether selected from one or more of capped polyalkyleneglycols and polyether polyols.

Preferably the polyurethane polymer is provided in the form of a dispersion in water. Suitable polyol reactants include, for example, polyols selected from one or more of saturated and unsaturated polyhydric alcohols (such as ethylene glycol, propylene glycol, 1,4-butanediol, 1,4-butenediol and cyclohexanedi-methanol), polyester polyols from the reaction of saturated and unsaturated polyhydric alcohols with saturated and unsaturated polycarboxylic acids (such as maleic acid, itaconic acid, succinic acid, terephthalic acid, phthalic anhydride and dimethyl terephthalate), polyether polyols (such as polyalkyleneglycols) and polycarbonate polyols (such as those formed from the reaction of polyhydric alcohols with diaryl carbonates). Optionally, polyols containing a carboxylic acid functional group may also be used, such as polyhydroxycarboxylic acids, for example, 2,2-dimethylolpropionic acid, 2,2-dimethylolbutyric acid and 2,2-dimethylolvaleric acid. Optionally, capped polyalkyleneglycols (monohydric hydroxy compounds) may be used in addition to the polyols, for example, poly(ethyleneglycol) methyl ether may be used to introduce polyether content into the polyurethane. Typically some portion of the polyol reactant is derived from polyols containing ionic or hydrophilic groups.

Suitable polyisocyanate reactants include, for example, aromatic, cycloaliphatic and aliphatic polyisocyanates such as 1,6-diisocyanatohexane (HDI), 4,4'-diisocyanatodicyclohexylmethane, 1,4-diisocyanatobutane, 2,4- and 2,6-tolylene diisocyanate, 4,4'-diisocyanatodiphenylether, methylene-bis(4-phenylisocyanate), m-phenylene diisocyanate and 1,2,4-benzene triisocyanate.

For example, a typical polyurethane polymer may contain 10 to 80%, preferably 30 to 70%, of polyol component; 5 to 40%, preferably 10 to 30%, of polyisocyanate component; and optionally zero to 40%, preferably 10 to 30%, of polyether component.

Typically the polyurethane polymer is formed by adding a polyol together with a catalyst (for example, 0.01 to 0.06% of di-butyl tin dilaurate or tin octoate) to a reaction vessel in the presence of solvent (such as N-methyl pyrrolidone, N,N-dimethyl formamide, methyl ethyl ketone, toluene and mixtures thereof) and heating the mixture at 70–100° C. with continuous or intermittent addition, over about 0.5–4 hours, of a polyisocyanate reactant. After complete addition of the polyisocyanate reactant the reaction mixture is maintained at 80–100° C. (typically 2–4 hours) to reduce the residual isocyanate content to below about 8%, based on weight of polymer. The reaction mixture is then cooled and any ionic groups present in the reaction product are neutralized by the addition of a weak base (for example, triethylamine, trimethylamine, dimethylethanolamine, triethanolamine or dimethylaminopropanol). The reaction mixture is then dispersed into water to form the polyurethane dispersion, typically having a final polymer solids level of about 20 to 60%, based on total weight of the dispersion. Optionally, a difunctional amine compound (for example, ethylenediamine, hexamethylene diamine or mixtures thereof) or a polyaziridinyl crosslinker agent may be included in the water medium to provide chain extension of the polyurethane. Alternatively, additional crosslinking may be introduced via air oxidation cure involving other coating formulation components. U.S. Pat. No. 6,384,131 may be consulted for further general and specific details on the preparation of polyurethane dispersions useful as second-coating compositions.

(7) Acrylic-based polymer product derived from combining (1) a first-stage polymer comprising, as polymerized monomer units: (a) zero up to 20, preferably 1 to 5 percent, based on weight of the first-stage polymer, of monoethylenically unsaturated monomer containing a carboxylic acid functional group; (b) 0.5 to 100, preferably 1 to 40 and more preferably 5 to 20 percent, based on weight of the first-stage polymer, of a (meth)acrylic monomer containing one or more pendant reactive acetoacetoxy functional groups; (c) zero up to 95, preferably 40 to 90 percent, based on weight of the first-stage polymer, of one or more ($C_1$–$C_{20}$)alkyl (meth)acrylate ester monomers; (d) zero up to 10 percent, based on weight of the first polymer, of one or more other copolymerizable monomers; with (2) an amine-containing reactant selected from one or more of the group consisting of polyamine and aminosilane reactants, in an amount sufficient to provide from 0.1 to 1.5, preferably from 0.3 to 1.0, equivalents of amino functional group per equivalent of acetoacetoxy group in the first-stage polymer; and crosslinking the polymer product through formation of diamine or siloxane linking groups.

Suitable polyamine reactants useful in the preparation of second-coating compositions involving polymer (7) include, for example, polyamines containing 2 to 100 carbon atoms where at least two of the amino groups are primary amine groups.

Suitable aminosilane reactants useful in the preparation of second-coating compositions involving polymer (7) include, for example, trimethoxysilylpropyl-diethylenetriamine, N-methylaminopropyltrimethoxysilane, aminoethylaminopropylmethyldimethoxysilane, aminoethylaminopropyltrimethoxysilane, aminopropylmethyldimethoxysilane, aminopropyltrimethoxysilane, polymeric aminoalkylsilicone, aminoethylaminoethylaminopropyltrimethoxysilane, N-methyl-aminopropyltrimethoxysilane, methylaminopropyltrimethoxysilane, aminopropylmethyldiethoxysilane, aminopropyltriethoxysilane, 4-aminobutyltriethoxy-silane and oligomeric aminoalkylsilanes. Preferably the aminosilane reactant is selected from one or more of aminopropyltrimethoxysilane, aminoethylamino-propyltrimethoxysilane, aminopropylmethyldiethoxysilane and aminoethylaminopropylmethyldimethoxysilane. Preferably, the polymer product is derived from combining (1) a first-stage polymer comprising, as polymerized monomer units: (a) 1 to 5 percent, based on weight of the first-stage polymer, of monoethylenically unsaturated monomer containing a carboxylic acid functional group; (b) 5 to 20 percent, based on weight of the first-stage polymer, of a (meth)acrylic monomer containing one or more pendant reactive acetoacetoxy functional groups; and (c) 40 to 90 percent, based on weight of the first-stage polymer, of one or more ($C_1$–$C_{20}$)alkyl (meth)acrylate ester monomers; with (2) an aminosilane reactant in an amount sufficient to provide from 0.3 to 1.0 equivalents of amino functional group per equivalent of acetoacetoxy group in the first-stage polymer. U.S. Pat. No. 5,426,142 may be consulted for further general and specific details on the preparation of aminosilane-modified polymers representative of polymer (7).

Representative suitable monomer components of polymers (4), (5), (6) and (7) are the same as corresponding monomer component types described for polymers (1), (2) and (3).

Methods for the preparation of the aqueous dispersible polymers of the coating compositions useful in the method of the present invention are well known in the art. Polymers (1), (2), (5), (6) and the first-stage polymers for polymers (3), (4) and (7) described above, may be solution, dispersion or emulsion polymers; preferably the polymers are emulsion polymers. The practice of emulsion polymerization is discussed in detail in D. C. Blackley, Emulsion Polymerization (Wiley, 1975). Suitable monomers may be emulsified with anionic or nonionic dispersing agents; for example, 0.5% to 10% based on the weight of total monomers being used. Acidic monomers are water soluble and thus serve as dispersing agents which aid in emulsifying the other monomers used. A polymerization initiator of the free radical type, such as ammonium or potassium persulphate, may be used alone or in conjunction with an accelerator, such as potassium metabisulfite or sodium thiosulfate. The initiator and accelerator, commonly referred to as catalysts, may be used in proportions of 0.1% to 2%, each based on the weight of monomers to be copolymerized. The polymerization temperature is typically from ambient temperature up to 90° C. Examples of emulsifiers suitable for emulsion polymerization include, for example, alkaline metal and ammonium salts of alkyl, aryl, alkaryl and aralkyl sulfonates, sulfates, polyether sulfates, and alkoxylated derivatives of fatty acids, esters, alcohols, amines, amides and alkylphenols. Chain transfer agents, including mercaptans, polymercaptans and polyhalogen compounds, may be used in the polymerization mixture to control molecular weight of the polymer.

An essential feature of the polymers used in the method of the present invention is the gel fraction value of the first- and second-coating composition polymers, respectively, as discussed above. The measurement of gel fraction is used as an indication of swellability of the polymer and its relative ease of removability under stripping conditions.

Uncrosslinked amorphous polymers, polymers that are lightly crosslinked, or those that have not undergone a sufficient degree of intermolecular crosslinking will be highly solvated by appropriate solvents and therefore 'swellable.' Because of their reduced free volume, polymers that have been sufficiently crosslinked in an intermolecular manner will be solubilized to a lesser extent, indicative of decreased swellability. These less solubilized polymer molecules will be swollen to form a soft gel which can be centrifuged out of the organic solvent solution. Other variables, such as polymer molecular weight, polymer composition, the composition of the solvent selected, and the affinity of the polymer and solvent for each other, will influence the gel fraction. For polymers based on acrylic esters and styrene as the major monomers, tetrahydrofuran (THF) is an appropriate solvent for determining gel fraction. More hydrophilic polymers, such as those based on moderately high levels of acidic or non-ionogenic hydrophilic monomers, are more readily solvated by acetone. Other solvents may be selected as appropriate to the composition of the polymers to be tested, but because the polymer is added to the solvent from an aqueous emulsion, it is preferred that the solvent be compatible or miscible with water. U.S. Pat. No. 5,676,741 may be consulted for further general and specific details regarding the determination of gel fraction values for polymers.

Typically, gel fraction values may be determined by charging a weighed aliquot of solvent ($W_v$) to a weighed sample of polymer emulsion ($W_p$) of known solids content ($W_s$) into a centrifuge tube. The mixture is then stirred overnight and subjected to ultracentrifugation. A weighed aliquot of the supernatant solution is then evaporated to dryness to determine the solid fraction ($S_s$). The soluble fractions and gel fractions are calculated as follows:

Soluble Fraction=$[S_s(W_v+W_p-W_s)]/W_s$

Gel Fraction=[1−Soluble Fraction]

Another aspect of the present invention involves the coated surface compositions that are provided by preparing multi-layer protective coatings by the method of the present invention. Preferred coated surface compositions include, for example, substrates bearing a multi-layer coating composition where the first-coating composition is an acrylic-based polymer product comprising, as polymerized monomer units: (a) 3 to 90 percent, based on weight of the polymer, of monoethylenically unsaturated monomer containing a carboxylic acid functional group; (b) zero up to 40 percent, based on weight of the polymer, of a (meth)acrylic monomer containing one or more pendant reactive functional groups selected from vinyl and hydroxy groups; (c) zero up to 80 percent, based on weight of the polymer, of one or more vinylaromatic monomers; (d) zero up to 97 percent, based on weight of the polymer, of one or more ($C_1$–$C_{20}$) alkyl (meth)acrylate ester monomers; (e) zero up to 10 percent, based on weight of the polymer, of one or more other copolymerizable monomers; and (f) zero up to 90 percent, based on equivalents of carboxylic acid groups of the polymer, of polyvalent metal ion. Additional preferred coated surface compositions include, for example, substrates bearing a multi-layer coating composition where the second-coating composition is an acrylic-based polymer product comprising, as polymerized monomer units: (a) zero to 30 percent, based on weight of the polymer, of a monoethyl-enically unsaturated monomer containing a carboxylic acid functional group; (b) 1 to 80 percent, based on weight of the polymer, of a (meth)acrylic monomer containing functional groups selected from one or more of isocyanurate, pendant vinyl, pendant acetoacetoxy and pendant amino groups; (c) zero up to 70 percent, based on weight of the polymer, of one or more vinylaromatic monomers; (d) zero up to 90 percent, based on weight of the polymer, of one or more ($C_1$–$C_{20}$) alkyl (meth)acrylate ester monomers; and (e) zero up to 10 percent, based on weight of the polymer, of one or more other copolymerizable monomers.

Some embodiments of the invention are described in detail in the following Examples. All ratios, parts and percentages are expressed by weight and all reagents used are of good commercial quality unless otherwise specified. Abbreviations used in the Examples and Tables are listed below with the corresponding descriptions:

| | |
|---|---|
| BA = | butyl acrylate |
| MMA = | methyl methacrylate |
| GMA = | glycidyl methacrylate |
| AA = | acrylic acid |
| MAA = | methacrylic acid |
| HEMA = | hydroxyethyl methacrylate |
| ST = | styrene |
| BHMR = | black heel mark resistance (% coverage) |
| [NCO] = | isocyanate concentration [equivalents] |
| [OH] = | hydroxyl or hydoxy group concentration [equivalents] |

Test Methods

Mar Resistance: This test is based on striking the coating at a shallow angle with a hard object; in the examples provided, the object was the fingernail of the individual performing the test. This test gives an indication of how the coating will resist marring, which leads to gloss reduction of the coating.

After the coating is applied to the substrate and allowed to cure, the coated substrate is placed on a solid surface such as a table top and struck with the operator's fingernail. The operator's fingernail is kept parallel to the coated surface and the impact angle is greater than 45° from the normal of the surface, to increase the likelihood of marking the coating.

When comparing coatings, it was important that the same operator perform the test. This test was designed to distinguish relative differences.

We used the following rating system:

| Rating | Appearance |
|---|---|
| 1 - Excellent (Exc) | No perceptible marks |
| 3 - Good | Marks which appear as thin scratches (<1 mm) |
| 5 - Poor | Marks which are wide (>1 mm) |

Black Heel Mark Resistance (BHMR): The method for determining black heel described in Chemical Specialty Manufacturers Association Bulletin No. 9–73 was utilized, except that commercially available rubber shoe heels were used in place of the recommended 5.08 cm (2 inch) rubber cubes. Furthermore, instead of subjectively rating the coated substrate, the percentage of the coated substrate area covered by black heel marks was determined; this was conveniently performed with transparent graph paper. A black heel mark is an actual deposition of rubber onto or into the coating.

Detergent Resistance: The method for determining detergent resistance is described in "Annual Book of ASTM Standards," Section 15, Volume 15.04, Test Procedure ASTM D 3207 (2000), except that a 1/20 dilution of Forward™ (S. C. Johnson and Sons, Inc., Racine, Wis.) in water was used as test detergent solution and a 1000-g weight was added to the brush assembly.

Removability: The method for determining polish removability is described in "Annual Book of ASTM Standards," Section 15, Volume 15.04, Test Procedure ASTM D-1792 (2000), except that a 1000-g weight was added to the boat assembly and a 1:2 aqueous mixture (1 part commercial stripper solution/2 parts water) of commercial stripper solution (5–15% 2-butoxyethanol and 30–40% monoethanolamine in water, provided as "FloorStar Power Strip" from ServiceMaster Company, Downers Grove, Ill.) was used as the stripping solution. Additionally, a commercial stripping solution of 5–15% 2-butoxyethanol and 30–40% monoethanolamine in water was further diluted with warm water (130–150° F.) and allowed to reside on the coated panel for 10 minutes before starting the scrub cycle.

Coating Application and Testing: The method for applying the floor polish (base coat or top coat) to substrates for testing purposes is described in "Annual Book of ASTM Standards," Section 15, Volume 15.04, Test Procedure ASTM D 1436 (2000). Test Method B (application of emulsion floor polish with a hand applicator) was used.

Preparation of multi-layer coatings: two coats of base coat polymer polish followed by two coats of top coat polymer were applied to vinyl composition panels with about one hour between coats. After the final coat, the coated panels were allowed to cure at 25° C. for 24 hours before testing. This format was used to evaluate mar, black heel mark and detergent resistance as well as polish film removability.

The following abbreviations and terms are used as indicators of position on scales of ratings used in reporting the "detergent resistance" and "ease of removability" characteristics, where "Very Poor" is the lowest rating and "Excellent" the highest rating:

| | |
|---|---|
| VP = | Very Poor |
| P = | Poor |
| F = | Fair |
| G = | Good |
| VG = | Very Good |
| Exc = | Excellent |

Formulation of Base Coat (First-Coating) Composition

The base coat floor polish was formulated by combining the various components listed below in Table 1 in the order indicated. The base coat polymer used to prepare samples of the multi-layer coating compositions of the present invention is described in Example 1.

EXAMPLE 1

Emulsion polymer having a composition of 30 BA/10.5 MMA/5 HEMA/4.5 MAA//40 ST/5 MMA/5 AA prepared as described in U.S. Pat. No. 4,150,005. The polymer emulsion further contained 40 equivalent % $Zn^{++}$ (added as zinc ammonium bicarbonate). The pH of the emulsion was adjusted to 9.0 with a final polymer solids content of 38%.

TABLE 1

Base Coat Floor Polish (see order of addition below)

| Material | Function | Amount (parts by weight) |
|---|---|---|
| Water | diluent | 31.57 |
| Zonyl ™ FSJ (1%)[1] | wetting agent | 0.50 |
| Kathon ™ CG/ICP (1.5%)[2] | biocide | 0.03 |
| SE-21[3] | defoamer | 0.02 |
| Diethylene Glycol Ethyl Ether | coalescent | 2.04 |
| Dipropylene Glycol Methyl Ether | coalescent | 2.04 |
| Dibutyl Phthalate | plasticizer | 0.93 |
| Tributoxy Ethyl Phosphate | leveling aid | 0.93 |
| Polymer Emulsion (Example 1) | vehicle | 45.68 |
| Michem Dispersion MD-915 (30%)[4] | alkali-soluble resin | 3.86 |
| AC-392N (35%)[5] | aqueous polyethylene wax emulsion | 6.41 |
| Epolene E-43N (40%)[6] | aqueous polyethylene wax emulsion | 5.79 |

[1]blend of flurosurfactant and a hydrocarbon surfactant (Zonyl ™ FSJ from E.I. duPont de Nemours, Wilmington, DE)
[2]isothiazolone mixture (Rohm and Haas Co., Philadelphia, PA)
[3]aqueous dispersion of polydimethylsiloxane (Wacker Silicones Corp., Adrian, MI)
[4]low molecular weight anionic polymer, aqueous dispersion (Michelman, Morristown, NJ)
[5]low molecular weight nonionic polyethylene, aqueous dispersion (Honeywell, Morristown, NJ)
[6]low molecular weight nonionic polypropylene, aqueous dispersion (Eastman Chemical, Morristown, NJ)

Formulation of Top Coat (Second-Coating) Composition 1

A top coat floor polish was formulated by combining the various components listed below in Table 2 in the order indicated. The top coat polymer used to prepare this floor polish formulation is described in Example 2.

EXAMPLE 2

Emulsion polymer having a composition of 53 MMA/34 BA/10 HEMA/3 MAA (pH=7.5, final polymer solids of 41%) with an [OH] equivalent weight of 3100, based on the HEMA content of the emulsion polymer, was used as the Part A polymer emulsion component in Table 2.

EXAMPLE 2A

Water-dispersible polyisocyanate based on diisocyanate derivatives is available as Bayhydur™ XP-7063 polyisocyanate (100% active ingredient, 17.1% [NCO], 245 g/equivalent [NCO]) from Bayer Corporation, Pittsburgh, Pa., and was used as component B in Table 2.

The top coat formulation was prepared by slowly adding Part B to Part A, followed by mild agitation for 5–10 minutes, to provide a final top coat polish formulation having 33.6% solids with an [NCO]:[OH] stoichiometric ratio of 1.1:1.

TABLE 2

Top Coat Floor Polish 1 (see order of addition below)

| Material | Function | Amount (parts by weight) |
|---|---|---|
| Part A: | | |
| Polymer Emulsion (Example 2) | acrylic emulsion | 62.95 |
| Premix and add under agitation: | | 0.50 |
| Water | diluent | 25.23 |
| Dipropylene Glycol Monomethyl Ether (DPM) | solvent | 1.89 |
| Then add: | | |
| Byk 346[1] | flow Aid | 0.09 |
| Acrysol ™ RM-825[2] | rheology modifier | 0.19 |
| Tego Glyde ™ 410[3] (50% in DPM) | mar aid | 0.19 |
| Tego Foamex ™ 805[3] | defoamer | 0.94 |
| Surfynol ™ 104 DPM[4] | wetting aid | 0.47 |
| Part B: | | |
| Bayhydur ™ XP-7063 | polyisocyanate | 5.50 |

[1]available from Byk Chemie
[2]available from Rohm and Haas Co., Philadelphia, PA
[3]available from Goldschmidt Chemical Corp.
[4]available from Air Products & Chemicals, Inc.

Formulation of Top Coat (Second-Coating) Composition 2

A radiation-curable top coat floor polish was formulated by combining the various components listed below in Table 3 in the order indicated. The top coat polymer used to prepare this floor polish formulation is described in Example 3.

EXAMPLE 3

Emulsion polymer having a composition of 37 BA/20 MMA/24 GMA/19 ST (typical pH=7.1, final polymer solids of 40–41%) was used as the polymer emulsion component in Table 3.

The top coat formulation was prepared by mixing the ingredients as listed in Table 3 to provide a final top coat polish formulation having 38% solids with a pH of 6.8.

The top coat formulation 2 was applied to panels as described under "Coating Application and Testing" section, allowed to dry and stored approximately 30 minutes at ambient temperature followed by curing in a UV apparatus. The curing system was Fusion UV-System, HP-6 series, with an H bulb, rated at 197 W (watts)/cm. The panels were passed under the UV light six times at a speed of 22 cm/second (44 feet/minute). The dosage was adjusted to 630 mJ/cm$^2$ per pass. The samples were passed through the focal plane of the lamp.

TABLE 3

Top Coat Floor Polish 2 (see order of addition below)

| Material | Function | Amount (parts by weight) |
|---|---|---|
| Polymer Emulsion (Example 3) Add under agitation: | acrylic emulsion | 92.4 |
| Darocur ™ 1173[1] | photoinitiator | 0.55 |
| Water | diluent | 5.38 |
| Tego Glyde ™ 410[2] (50% in DPM) | mar aid | 0.23 |
| Surfynol ™ 104 DPM[3] | wetting aid | 0.54 |
| Acrysol ™ RM-825[4] | rheology modifier | 0.70 |
| Byk 346[5] | flow aid | 0.09 |

[1]available from Ciba-Geigy Corp.
[2]available from Goldschmidt Chemical Corp.
[3]available from Air Products & Chemicals, Inc.
[4]available from Rohm and Haas Co., Philadelphia, PA
[5]available from Byk Chemie Experimental Test Results Testing of coating compositions represented by Examples 4–8 demonstrates the improvement in performance properties of coating formulations using the multi-layer coating compositions of the present invention.

EXAMPLE 4 (COMPARATIVE)

Coating composition coated onto test panel using coating formulation described in Table 1 (base coat alone).

EXAMPLE 5 (COMPARATIVE)

Coating composition coated onto test panel using coating formulation described in Table 2 (top coat floor polish 1 alone).

EXAMPLE 6 (PRESENT INVENTION)

Multi-layer coating composition coated onto test panel using base coat formulation described in Table 1 and top coat formulation 1 described in Table 2, applied as described under "Coating Application and Testing" section.

EXAMPLE 7 (COMPARATIVE)

Coating composition coated onto test panel using coating formulation described in Table 3 (top coat floor polish 2 alone).

EXAMPLE 8 (PRESENT INVENTION)

Multi-layer coating composition coated onto test panel using base coat formulation described in Table 1 and top coat formulation 2 described in Table 3, applied as described under "Coating Application and Testing" section.

Tables 4 and 5 summarize the performance properties of the multi-layer coating compositions of the present invention with regard to durability and ease of removability. Multi-layer coating compositions of the present invention, represented by Examples 6 and 8, combine the durability benefits (mar, black heel mark and detergent resistance) of the individual top coat compositions (Examples 5 and 7) with the ease of removability of the base coat composition (Example 4), but without the poor removability of the individual top coat compositions or the poor durability of the base coat composition when used alone.

TABLE 4

|  | Ex 4* | Ex 5* | Ex 6 |
| --- | --- | --- | --- |
| Base Coat | Yes | No | Yes |
| Top Coat | No | Yes | Yes |
| Mar Resistance | 3 | 1 | 1 |
| BHMR (% Coverage) | 5.7 | 2.1 | 1.9 |
| Detergent Resistance | Good | Exc | Exc |
| Removability | Exc | Poor | Good |

*= comparative

TABLE 5

|  | Ex 4* | Ex 7* | Ex 8 |
| --- | --- | --- | --- |
| Base Coat | Yes | No | Yes |
| Top Coat | No | Yes | Yes |
| Mar Resistance | 3 | 1 | 1 |
| BHMR (% Coverage) | 5.7 | 2 | 2 |
| Detergent Resistance | Good | Exc | Exc |
| Removability | Exc | Poor | Good |

*= comparative

I claim:

1. A method for preparing a multi-layer coating composition comprising:
    (a) applying a first-coating composition to a substrate wherein the first-coating composition comprises a polymer product having a gel fraction of 0.3 to 0.95 in a solvent selected from one or more of acetone and tetrahydrofuran and wherein the first-coating composition is applied in one or more separate applications, allowing the first-coating composition to dry after each application; and
    (b) applying a second-coating composition onto the dried first-coating composition of step (a) wherein the second-coating composition comprises a polymer product having a gel fraction of greater than 0.95 and up to 0.99 in a solvent selected from one or more of acetone and tetrahydrofuran and wherein the second-coating composition is applied in one or more separate applications, allowing the second-coating composition to dry after each application.

2. The method of claim 1 wherein the first-coating composition is an acrylic-based polymer product selected from one or more of:
    (1) first polymer comprising, as polymerized monomer units:
        (a) 3 to 90 percent, based on weight of the first polymer, of monoethylenically unsaturated monomer containing a carboxylic acid functional group;
        (b) zero up to 40 percent, based on weight of the first polymer, of a (meth)acrylic monomer containing one or more pendant reactive functional groups selected from vinyl and hydroxy groups;
        (c) zero up to 80 percent, based on weight of the first polymer, of one or more vinylaromatic monomers;
        (d) zero up to 97 percent, based on weight of the first polymer, of one or more ($C_1$–$C_{20}$)alkyl (meth) acrylate ester monomers;
        (e) zero up to 10 percent, based on weight of the first polymer, of one or more other copolymerizable monomers; and
        (f) zero up to 90 percent, based on equivalents of carboxylic acid groups of the first polymer, of polyvalent metal ion;
    (2) second polymer comprising, as polymerized monomer units:
        (a) 3 to 30 percent, based on weight of the second polymer, of a monoethylenically unsaturated monomer containing amino-group functionality;
        (b) 0.2 to 9 percent, based on weight of the second polymer, of a (meth)acrylic monomer containing one or more pendant reactive functional groups selected from vinyl, epoxy and acetoacetoxy groups;
        (c) zero up to 80 percent, based on weight of the second polymer, of one or more vinylaromatic monomers;
        (d) zero up to 97 percent, based on weight of the second polymer, of one or more ($C_1$–$C_{20}$)alkyl (meth) acrylate ester monomers; and
        (e) zero up to 10 percent, based on weight of the second polymer, of one or more other copolymerizable monomers; and
    (3) third polymer derived from combining: (i) a first-stage polymer comprising, as polymerized monomer units:
        (a) 5 to 50 percent, based on weight of the first-stage polymer, of a monoethylenically unsaturated monomer containing an acid functional group selected from one or more of carboxylic, sulfonic and phosphonic groups;
        (b) zero up to 60 percent, based on weight of the first-stage polymer, of a (meth)acrylic monomer containing one or more pendant reactive functional groups selected from hydroxy, thiol, and amino groups;
        (c) zero up to 70 percent, based on weight of the first-stage polymer, of one or more vinylaromatic monomers;
        (d) 15 to 90 percent, based on weight of the first-stage polymer, of one or more ($C_1$–$C_{20}$)alkyl (meth) acrylate ester monomers; and
        (e) zero up to 10 percent, based on weight of the first-stage polymer, of one or more other copolymerizable monomers;
    with (ii) a polyfunctional crosslinker agent comprising pendant functional groups selected from one or more of isocyanate, carbodiimide, aziridinyl and epoxy groups; wherein, the first-stage polymer has a number average molecular weight from greater than 5,000 up to 2,000,000; and the polyfunctional crosslinker agent is used in an amount sufficient to provide from 0.2 to 5 equivalents of pendant functional group per equivalent of corresponding pendant reactive functional group in the first-stage polymer.

3. The method of claim 2 wherein the first polymer comprises, as polymerized units: (a) 6 to 30 percent of monoethylenically unsaturated monomer containing a carboxylic acid functional group; and (b) 15 to 80 percent, based on equivalents of carboxylic acid groups of the first polymer, of polyvalent metal ions.

4. The method of claim 2 wherein the first polymer comprises polyvalent metal ions selected from one or more of the group consisting of zinc, calcium, magnesium and zirconium.

5. The method of claim 1 wherein the first-coating composition is a polyurethane polymer that is the reaction product of at least two polyol reactants and a polyisocyanate reactant comprising as polymerized units:
    (a) 2 to 50 percent, based on weight of the polyurethane polymer, of a polyol containing a carboxylic acid functional group;
    (b) 2 to 80 percent, based on weight of the polyurethane polymer, of polyol selected from one or more of saturated and unsaturated polyhydric alcohols, polyester polyols, polyether polyols and polycarbonate polyols;

(c) 20 to 70 percent, based on weight of the polyurethane polymer, of a polyisocyanate reactant selected from one or more of aromatic, cycloaliphatic and aliphatic polyisocyanates; and (d) zero up to 40 percent, based on weight of the polyurethane polymer, of a polyether selected from one or more of capped polyalkyleneglycols and polyether polyols;

wherein calcium ion crosslinker agent is present in an amount sufficient to provide from 0.05 to 0.9 equivalents of calcium ion per equivalent of corresponding carboxylic acid functional group.

6. The method of claim 1 wherein the second-coating composition is an acrylic-based polymer product derived from combining:

(1) a first-stage polymer comprising, as polymerized monomer units:

(a) 0.1 to 30 percent, based on weight of the first-stage polymer, of a monoethylenically unsaturated monomer containing a carboxylic acid functional group;

(b) zero up to 60 percent, based on weight of the first-stage polymer, of a (meth)acrylic monomer containing one or more pendant reactive functional groups selected from vinyl, epoxy, hydroxy, thiol, acetoacetoxy and amino groups;

(c) zero up to 70 percent, based on weight of the first-stage polymer, of one or more vinylaromatic monomers;

(d) zero up to 90 percent, based on weight of the first-stage polymer, of one or more ($C_1$–$C_{20}$)alkyl (meth)acrylate ester monomers; and (e) zero up to 10 percent, based on weight of the first-stage polymer, of one or more other copolymerizable monomers; with (2) a polyfunctional crosslinker agent comprising pendant functional groups selected from one or more of isocyanate, carbodiimide, aziridinyl, vinyl, hydroxy, thiol, acetoacetoxy, amino and epoxy groups;

wherein, the first-stage polymer has a number average molecular weight from greater than 5,000 up to 2,000,000; and the polyfunctional crosslinker agent is used in an amount sufficient to provide from 0.2 to 10 equivalents of pendant functional group per equivalent of corresponding pendant reactive functional group in the first-stage polymer.

7. The method of claim 6 wherein the first-stage polymer comprises, as polymerized units: (a) 1 to 20 percent, based on the weight of the first-stage polymer, of monoethylenically unsaturated monomer containing a carboxylic acid functional group; (b) 2 to 60 percent, based on the weight of the first-stage polymer, of a (meth)acrylic monomer containing one or more pendant hydroxy functional groups; and (c) 0 to 20 percent, based on the weight of the first-stage polymer, of one or more (C1–C20)alkyl (meth)acrylate ester monomers; wherein the polyfunctional cross-linker agent comprises pendant isocyanate functional groups.

8. The method of claim 1 wherein the second-coating composition is an acrylic-based polymer product comprising, as polymerized monomer units:

(a) zero to 30 percent, based on weight of the polymer, of a monoethylenically unsaturated monomer containing a carboxylic acid functional group;

(b) 1 to 80 percent, based on weight of the polymer, of a (meth)acrylic monomer containing functional groups selected from one or more of isocyanurate, pendant vinyl, pendant acetoacetoxy and pendant amino groups;

(c) zero up to 70 percent, based on weight of the polymer, of one or more vinylaromatic monomers;

(d) zero up to 90 percent, based on weight of the polymer, of one or more ($C_1$–$C_{20}$)alkyl (meth)acrylate ester monomers; and (e) zero up to 10 percent, based on weight of the polymer, of one or more other copolymerizable monomers.

9. The method of claim 8 wherein the polymer product comprises, as polymerized units: (a) 5 to 70 percent, based on the weight of the polymer, of a (meth)acrylic monomer containing one or more vinyl functional groups; (b) 10 to 40 percent, based on the weight of the polymer, of one or more vinyl aromatic monomers; and (c) 20 to 80 percent, based on the weight of the polymer, of one or more ($C_1$–$C_{20}$)alkyl (meth)acrylate ester monomers.

10. The method of claim 1 wherein the second-coating composition is a polyurethane polymer that is the reaction product of at least one polyol with a polyisocyanate reactant comprising as polymerized units:

(a) zero up to 20 percent, based on weight of the polyurethane polymer, of a polyol containing a carboxylic acid functional group;

(b) 10 to 80 percent, based on weight of the polyurethane polymer, of polyol selected from one or more of saturated and unsaturated polyhydric alcohols, polyester polyols, polyether polyols and polycarbonate polyols;

(c) 10 to 30 percent, based on weight of the polyurethane polymer, of a polyisocyanate reactant selected from one or more of aromatic, cycloaliphatic and aliphatic polyisocyanates; and (d) zero up to 40 percent, based on weight of the polyurethane polymer, of a polyether selected from one or more of capped polyalkyleneglycols and polyether polyols.

11. The method of claim 1 wherein the second-coating composition is an acrylic-based polymer product derived from combining:

(1) a first-stage polymer comprising, as polymerized monomer units:

(a) zero to 20 percent, based on weight of the first-stage polymer, of monoethylenically unsaturated monomer containing a carboxylic acid functional group;

(b) 0.5 to 100 percent, based on weight of the first-stage polymer, of a (meth)acrylic monomer containing one or more pendant reactive acetoacetoxy functional groups;

(c) zero up to 95 percent, based on weight of the first-stage polymer, of one or more ($C_1$–$C_{20}$)alkyl (meth)acrylate ester monomers;

(d) zero up to 10 percent, based on weight of the first polymer, of one or more other copolymerizable monomers; with (2) an amine-containing reactant selected from one or more of the group consisting of polyamine and aminosilane reactants, in an amount sufficient to provide from 0.1 to 1.5 equivalents of amino functional group per equivalent of acetoacetoxy group in the first-stage polymer; and crosslinking the polymer product through formation of diamine or siloxane linking groups.

12. The method of claim 11 wherein the polymer product is prepared from combining:

(1) a first-stage polymer comprising, as polymerized units: (a) 1 to 5 percent, based on the weight of the first-stage polymer, of monoethylenically unsaturated monomer containing a carboxylic acid functional group; (b) 5 to 20 percent, based on the weight of the first-stage polymer, of a (meth)acrylic monomer containing one or more pendant acetoacetoxy functional groups; and (c) 40 to 90 percent, based on the weight of the first-stage polymer, of one or more $(C_1-C_{20})$alkyl (meth)acrylate ester monomers; with (2) an aminosilane reactant in an amount sufficient to provide from 0.3 to 1.0 equivalents of amino functional groups per equivalent of acetoacetoxy groups in the first stage polymer.

13. A coated surface composition comprising a substrate bearing a multi-layer coating comprising:
   (a) a first-coating composition disposed upon the substrate, wherein the first coating composition comprises a polymer product having a gel fraction in acetone of 0.3 to 0.95; and
   (b) a second-coating composition disposed upon the first coating composition, wherein the second coating composition comprises a polymer product having a gel fraction in acetone of greater than 0.95 and up to 0.99;
wherein the substrate is selected from one or more of flooring, wall, ceiling and tile materials.

14. The coated surface composition of claim 13 wherein the first-coating composition is an acrylic-based polymer product comprising, as polymerized monomer units:
   (a) 3 to 90 percent, based on weight of the polymer, of monoethylenically unsaturated monomer containing a carboxylic acid functional group;
   (b) zero up to 40 percent, based on weight of the polymer, of a (meth)acrylic monomer containing one or more pendant reactive functional groups selected from vinyl and hydroxy groups;
   (c) zero up to 80 percent, based on weight of the polymer product, of one or more vinylaromatic monomers;
   (d) zero up to 97 percent, based on weight of the polymer, of one or more $(C_1-C_{20})$alkyl (meth)acrylate ester monomers;
   (e) zero up to 10 percent, based on weight of the polymer, of one or more other copolymerizable monomers; and
   (f) zero up to 90 percent, based on equivalents of carboxylic acid groups of the polymer, of polyvalent metal ion.

15. The coated surface composition of claim 13 wherein the second-coating composition is an acrylic-based polymer product comprising, as polymerized monomer units:
   (a) zero to 30 percent, based on weight of the polymer, of a monoethylenically unsaturated monomer containing a carboxylic acid functional group;
   (b) 1 to 80 percent, based on weight of the polymer, of a (meth)acrylic monomer containing functional groups selected from one or more of isocyanurate, pendant vinyl, pendant acetoacetoxy and pendant amino groups;
   (c) zero up to 70 percent, based on weight of the polymer, of one or more vinylaromatic monomers;
   (d) zero up to 90 percent, based on weight of the polymer, of one or more $(C_1-C_{20})$alkyl (meth)acrylate ester monomers; and
   (e) zero up to 10 percent, based on weight of the polymer, of one or more other copolymerizable monomers.

16. The coated surface composition of claim 13 wherein the flooring, wall, ceiling and tile materials are selected from one or more of the group consisting of polymer, vinyl polymer, concrete, marble, ceramic and wood.

* * * * *